Feb. 17, 1925.
J. P. SEAHOLM
1,526,872
RELEASABLE DRAFT HITCH
Filed Feb. 9, 1922  2 Sheets-Sheet 2
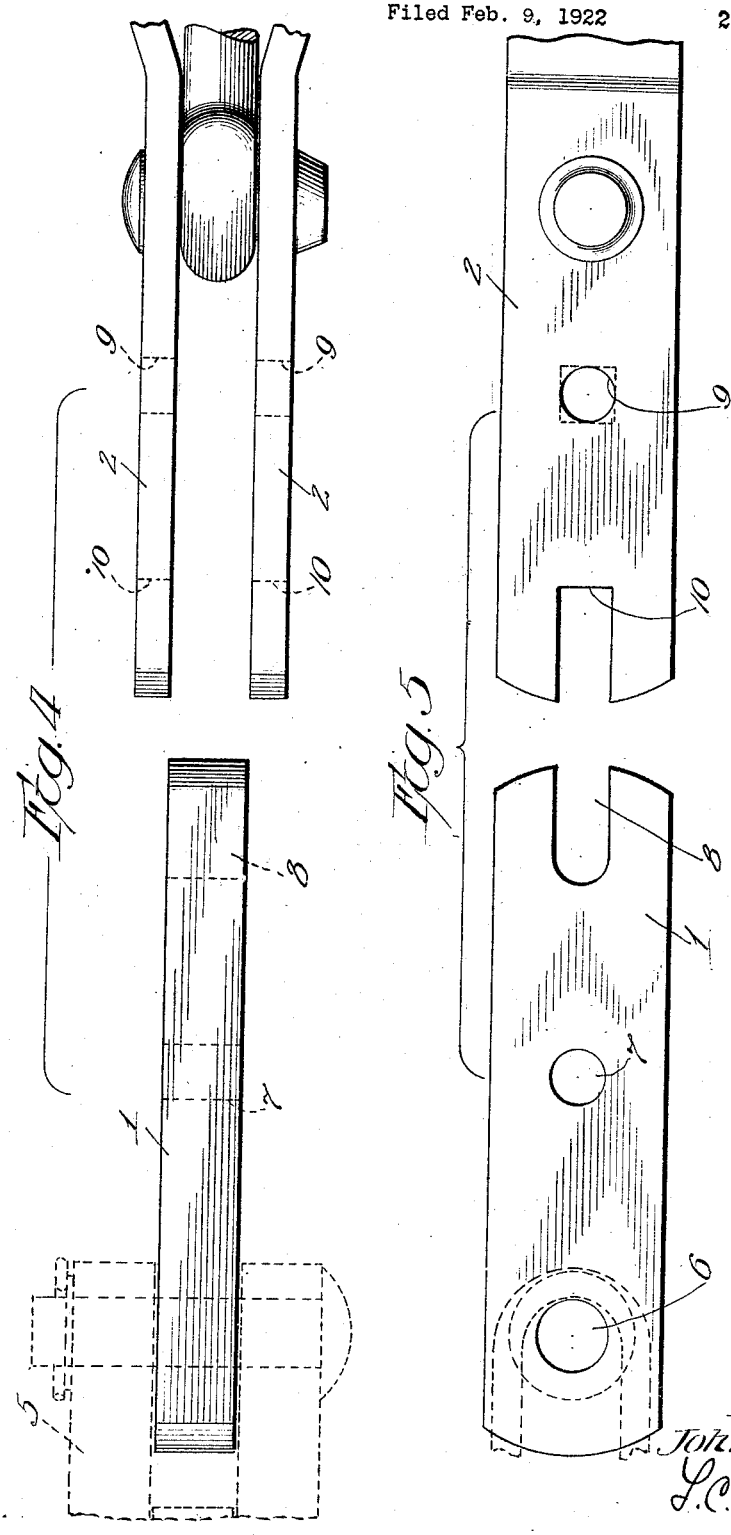

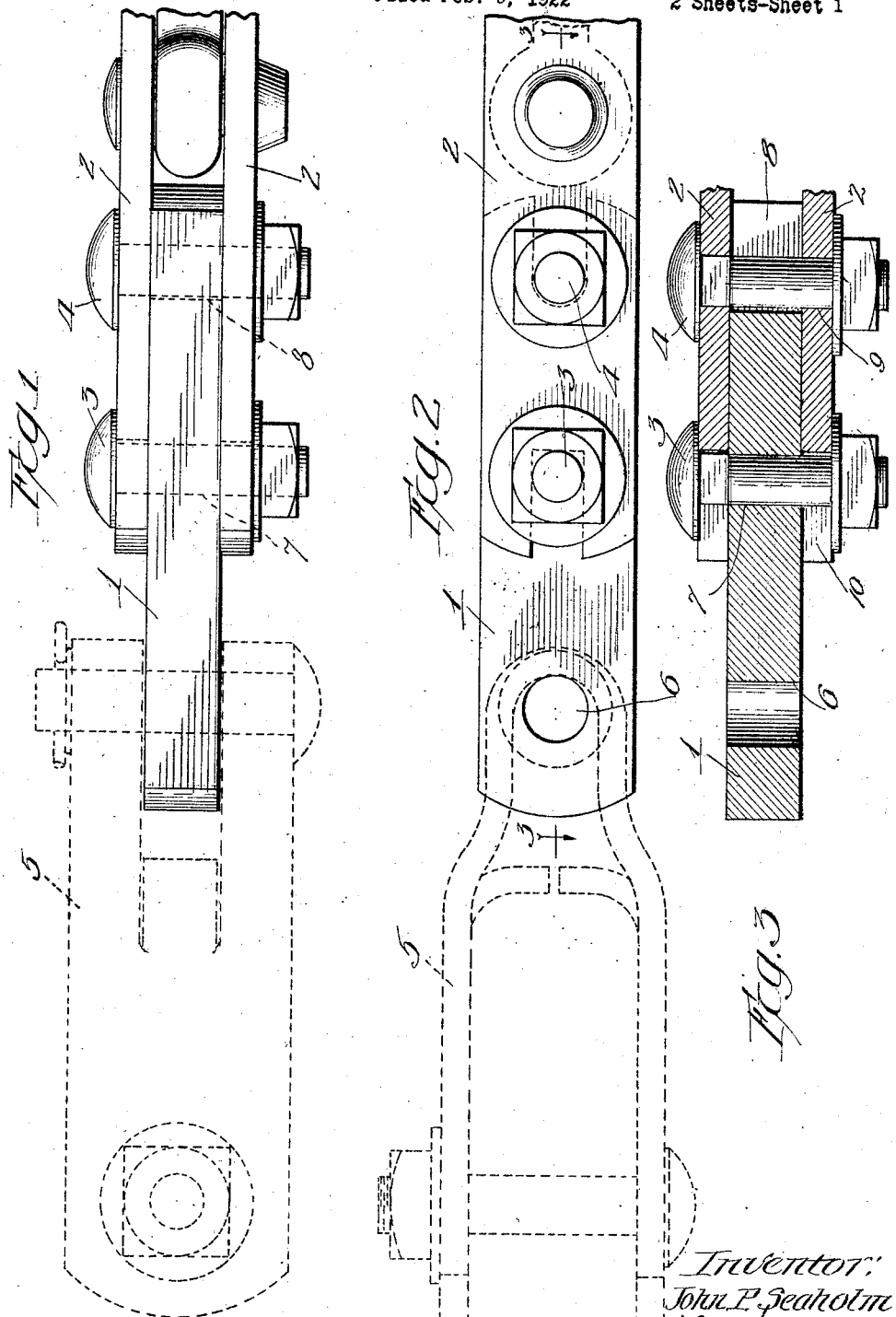

Patented Feb. 17, 1925.

1,526,872

UNITED STATES PATENT OFFICE.

JOHN P. SEAHOLM, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

RELEASABLE DRAFT HITCH.

Application filed February 9, 1922. Serial No. 535,126.

*To all whom it may concern:*

Be it known that I, JOHN P. SEAHOLM, a citizen of the United States, residing at 1138 14th St., Moline, county of Rock Island, State of Illinois, have invented certain new and useful Improvements in Releasable Draft Hitches, of which the following is a specification.

The invention relates to releasable draft hitches.

It is particularly useful for draft connections for agricultural implements in which it is desirable to break the connection between the implement and the source of power whenever the implement strikes too great an obstruction.

It has heretofore been common to utilize for this purpose a break pin, that is, a wooden pin for connecting certain of the draft parts together which pin would break whenever the pull became too great. The difficulty with a break pin is that whenever it breaks, a new pin must be used to reconnect the parts. This is often inconvenient and takes considerable time because the operator seldom has a new pin available when the old one breaks. It is also somewhat difficult to regulate the point at which the pin will break because its strength depends upon the character of the wood employed, its age, etc. There is also a tendency for operators to use too strong a pin or perhaps to substitute an iron bolt in order to avoid the task of replacing a broken pin.

The present invention has been devised to overcome the difficulties of the old break pin construction by providing a releasable draft hitch which can be readily reconnected after it is separated, and one which can be easily adjusted so that the point at which it will break can be varied.

A further object is to provide a construction which cannot be connected together so that it will not separate.

Other objects are to provide a releasable draft hitch that can be inexpensively produced, one that will require no expense for its maintenance, and, one that is strong and durable.

Other objects and advantages of the invention will appear from the specification and drawings.

An embodiment of the invention is shown in the drawings in which,—

Figure 1 is a plan view of the connected draft hitch.

Figure 2 is a side elevation of the draft hitch in connected position.

Figure 3 is a section on the line 3—3 of Figure 2.

Figure 4 is a plan view of the hitch showing the parts separated.

Figure 5 is a side elevation of the hitch showing the parts separated.

The hitch comprises, in general, a hitch member 1, a drawn member 2, and means comprising bolts 3 and 4 for connecting the members together.

The member 1, which has been called the hitch member because it is arranged to be connected or hitched to a clevis 5 shown in dotted lines, is provided with an opening 6 by means of which it may be connected to such clevis. This member also has a hole 7 punched through it intermediate its ends and an open-ended slot 8 at the end opposite the clevis-attaching hole.

The drawn member 2, which in this case, comprises the ends of a pair of draft bars, is formed of two parallel portions having holes 9 intermediate their ends and open-ended slots 10 in one end. These parallel portions are separated just enough to embrace the hitch member 1 and the openings in the members are spaced so that the holes in one member coincide with the slots in the other. This will be clear from the drawings by referring to Figure 3.

The means for connecting the members preferably comprises bolts 3 and 4, which extend through the openings in the members, and releasably hold them together. By tightening the bolts the members may be held together with varying degrees of tightness, thereby varying the point at which the members will separate under a draft pull.

When connected together with the bolts tightened, the hitch comprises a rigid draft connection. The inter-relation of the parts prevents wobbling and looseness and makes the hitch practically as rigid as if it were of unitary construction.

If the implement to which this hitch is connected should strike an obstruction so that the pull on the hitch exceeds a safe amount, the members will slip apart thereby disconnecting the source of power from the implement and preventing the implement being damaged by an excessive strain.

The members can be easily reconnected by simply loosening the bolts slightly, re-engaging the parts and then again tightening the bolts. The degree to which these bolts are tightened will determine the point at which the draft hitch will break apart.

The advantages of this construction will be appreciated by the practical user. Not only can the hitch be easily adjusted to vary the point at which it will separate, but also, after it has separated, it can be readily reconnected and, if desired, it can be tightened so that it will not break apart until a heavier draft strain has been put upon it. However, it will be impossible to connect it so that it never breaks apart because it is not possible to tighten the bolts sufficiently to prevent the members separating when the strain gets great enough.

In order to vary the operation of the hitch as between large draft devices and small draft devices, the area of the contact surfaces and size of the bolts can be varied so as to obtain a variation in the gripping strength of the hitch.

It will be understood that the structure shown is for purposes of illustration only and that other structures may be devised without departing from the spirit and scope of the appended claims.

I claim:

1. A releasable draft hitch comprising a member having a hole intermediate its ends and an open-ended slot in one end, a second member having a hole intermediate its ends and an open-ended slot in one of its ends, and means for connecting the members together extending through the hole in one piece and the slot in the other piece.

2. A releasable draft hitch comprising a member having a hole intermediate its ends and an open-ended slot in one end, a second member having a hole intermediate its ends and an open-ended slot in one end, said members being positioned together so that the slot in one is opposite the hole in the other, and bolts extending through the coinciding openings for releasably holding the parts together.

3. A releasable draft hitch comprising a member in the form of a flat bar having a hole intermediate its ends and an open-ended slot in one end, a second member comprising two parallel pieces adapted to embrace the first member, said parallel pieces having coinciding holes intermediate their ends positioned coincident with the slot in the first member and also having open-ended slots in their ends positioned coincident with the hole in the first member, and bolts extending through said coinciding openings for releasably holding the parts together.

In testimony whereof, I affix my signature.

JOHN P. SEAHOLM.